May 21, 1940.  H. S. CAMPBELL  2,201,810
ROTARY WINGED AIRCRAFT
Filed March 7, 1938  2 Sheets-Sheet 2

INVENTOR.
Harris S. Campbell
BY
Synnestvedt + Lechner
ATTORNEYS.

Patented May 21, 1940

2,201,810

UNITED STATES PATENT OFFICE 2,201,810

ROTARY WINGED AIRCRAFT

Harris S. Campbell, Willow Grove, Pa., assignor, by mesne assignments, to Autogiro Company of America, a corporation of Delaware Application March 7, 1938, Serial No. 194,268

19 Claims. (Cl. 244—18)

This invention relates to rotary winged aircraft and especially to that general type of craft which is equipped with a bladed sustaining rotor in which the blade or blades of the rotor are articulated to a generally upright hub.

Still more specifically, the invention has reference to a blade mounting providing for pitch change movements under different conditions of operation.

The invention contemplates a blade mounting such as to provide for automatic change of blade pitch in one sense upon application of driving torque to the rotor, centrifugal force preferably being relied upon to effect pitch change movement in the opposite sense upon cessation of the driving torque.

Still more particularly, the invention provides pivot mechanism for mounting the blade or blades of the rotor, preferably including a pitch change hinge, arranged to provide decrease of blade pitch upon application of a driving torque and increase of blade pitch under the influence of centrifugal force upon cessation of the driving torque.

Still another object of the invention is to provide a plurality of mounting pivots for each blade, including a "flapping" pivot to compensate for differential lift effects, a "drag" pivot to provide freedom for lag and lead displacements of the blade under the influence of flight forces, and the oblique pitch change pivot already mentioned, all of the pivots and the blade pitch setting being such as to provide for autorotational actuation of the motor in flight, and the drag and pitch change pivots being arranged to provide for lag and lead displacements of the blade during autorotational actuation about the drag hinge only, the oblique pitch change pivot at this time being rendered inoperative under the influence of flight forces but being capable of being brought into operation when a driving torque is applied to the rotor. Such driving torque may desirably be delivered to the rotor for purposes of starting the rotor or "overspeeding" the rotor prior to take-off from the ground, so as to effect steep or substantially vertical take-off without torque in the body of the craft, by cutting off the drive prior to the time the machine actually leaves the ground, this general style of flight being disclosed more fully in the copending application of Juan de la Cierva, Serial No. 738,349, filed August 3, 1934.

In accordance with another aspect of the invention, provision is made for automatically carrying the blade pitch movement about the oblique pitch change pivot to a higher than normal autorotational setting upon cutting off of the drive at a rotational rate higher than the normal autorotational rate, whereby a high degree of initial thrust is obtained for take-off purposes. The structural features further provide for decrease of blade pitch to the normal autorotational rate upon reduction of rotor speed to the substantially normal autorotational rate.

Still further, the invention has in view provision of locking means, serving primarily as a safety device, for ensuring that the blade will retain the desired pitch setting for different conditions, even when unintentional momentary reduction in driving torque occurs. In the preferred embodiment the locking means is interlocked with the control for the rotor driving means, as will appear more fully hereinafter.

The manner in which the foregoing objects and advantages are attained will appear to best advantage from a consideration of the following description referring to the accompanying drawings, in which—

Figure 1:
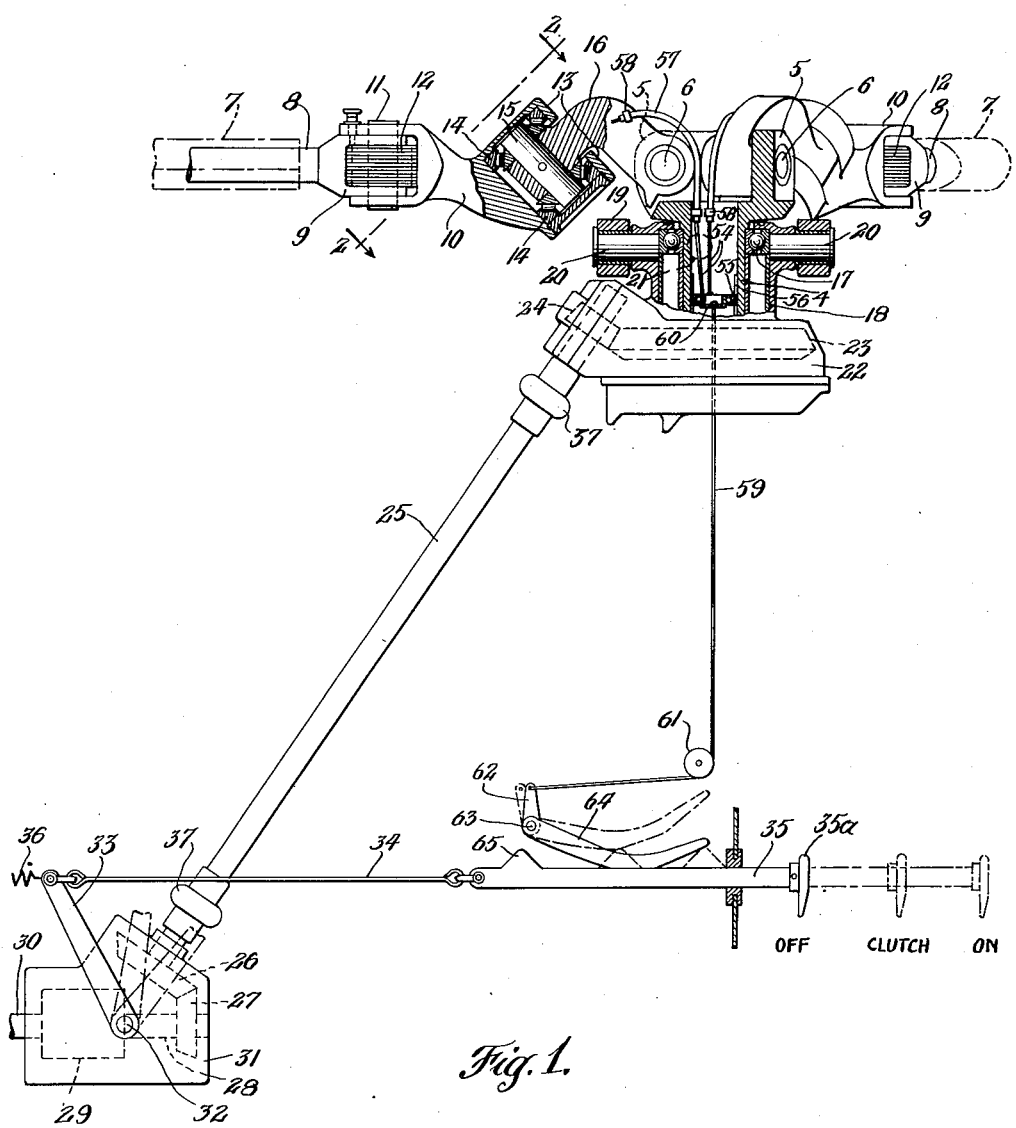
Figure 1 is a somewhat diagrammatic side view of a rotor head, the root end of two blades, a rotor drive mechanism, and control system therefor, all constructed in accordance with the invention, and certain parts being shown in vertical section.

Referring to Figure 1, a rotative hub or spindle is shown at 4, this hub part having pairs of apertured ears 5 to which the blades of the rotor are connected by means of substantially horizontal or flapping pivots 6. The rotor may incorporate any desired number of blades, the form shown including three such blades, the inner ends of two of which appear at 7. The structure of each blade is built up on a main spar 8 having at its inner end a forked fitting 9 cooperating with another fork member 10, these two members being joined by a drag pivot 11 positioned to provide freedom for lag and lead movements of the blade substantially generally in its path of rotation. A damper device 12 may be arranged between the pairs of prongs of the fork members 9 and 10, as shown for example in the copending application of Agnew E. Larsen, Serial No. 106,343, filed October 19, 1936, now Patent No. 2,155,427, dated April 25, 1939. This damper device may serve to control or restrict blade movements about the drag pivot 11 in flight operation.

The member or link 10 extended inwardly from the drag pivot is provided at its inner end with opposed bearing housings 13—13 for mounting roller bearings 14 which cooperate with the oblique pitch change pivot 15, which pivot also cooperates with a second link 16 which is apertured at its inner end for cooperation with the flapping pivot 6. Each blade is thus mounted for pivotal movement in a direction generally transverse its rotative path of travel (about the flapping pivot 6), for pivotal movement within the path of rotation (about the drag pivot 11) and for pitch change movement (upon lag and lead displacements about the oblique pivot 15).

The rotative hub part 4 is journalled as by one or more bearings 17 within a non-rotative hub casing 18 which is preferably mounted within a gimbal ring 19 by means of a pair of trunnions 20—20. The gimbal ring in turn is carried on any suitable fixed rotor support by means of trunnions 21. In this way freedom is provided for tilting movement of the entire rotor hub assembly in all directions, such tilting being of use for purposes of control of the craft in flight, in the manner disclosed in copending application of Juan de la Cierva, Serial No. 645,985, filed December 6, 1932.

Toward its lower end, and within the housing 22, the rotative hub part 4 is provided with a gear 23 cooperating with pinion 24 mounted at the upper end of drive shaft 25. Torque may thus be delivered to the rotor, and it may here be noted that provision is preferably made for free overrunning of the rotor with respect to the drive, as by means of an overrunning clutch associated with the ring gear 23.

The lower end of drive shaft 25 is geared as at 26—27 to shaft 28, connected with the delivery side of a clutch device 29, the driving side thereof being associated with the power shaft 30 which preferably is coupled to the forward propulsion engine (not shown) for the craft. The clutch and gearing parts just mentioned may conveniently be housed within a casing 31, out of which the clutch actuating shaft 32 projects for connection with the actuating arm 33. The clutch may be actuated by means of a cable 34 extended for connection to the manually actuable control organ 35, the clutch being biased to release position by spring 36.

Any suitable flexible joints 37 may be inserted in the drive shafting 25 to accommodate tilting movement of the rotor hub.

Turning again to the blade pivot arrangement, it is here noted that the employment of a triple articulation mounting for a blade, incorporating a flapping, a drag, and a pitch change pivot, is not per se a part of the present invention, the same being described and claimed in copending application of J. A. J. Bennett, Serial No. 21,454, filed May 14, 1935, now Patent No. 2,154,601, dated April 18, 1939. Certain improved arrangements of these pivots, and associated mechanisms, control devices and the like, however, as described hereinafter, perform some desirable new functions and effect improvements in operation. In considering these, reference is now made to Figure 2. As here shown, the axis of the pitch change pivot 15 is offset forwardly (with respect to the direction of rotation of the rotor) from the longitudinal axis of the blade, or from a line A—A joining the center of gravity of the blade with the axis of the hub indicated at B. Because of this offset, it will be seen that under the influence of centrifugal force, a moment is set up tending to move the blade on the pitch change pivot 15 in a leading direction. The application of a driving torque to the rotor hub 4, however, tends to cause the blade to lag on the axis of pivot 15, and the invention contemplates so locating the axis of this pivot as to obtain automatic lag and lead movements about pivot 15 as between "power on" and "power off" conditions. In association with this offset, definite limits of movement are established by means of stop devices constructed as follows:

A pair of upper and lower spaced arms 38 project rearwardly from the bearing housings 13 for the pitch pivot (with respect to the direction of rotation), these arms being bridged at their outer ends by an arcuate member 39 having stops 40 and 41 toward opposite ends thereof. The link member 16 carries a similarly projecting arm 42 located between the arms 38 and having stop surfaces 43 and 44 adapted to cooperate respectively with stops 40 and 41.

In low pitch position the stop surface 43 abuts stop 40, and in the autorotational pitch position (the position of Figure 2) the stop surface 44 abuts stop 41. The stop devices thus define a range of pitch change movement limited, on the one hand, preferably by a substantially zero value for use during starting of the rotor and overspeeding for direct take-off and, on the other hand, by a value suitable for autorotational flight.

The position of the pivot, i. e. its offset from the center of rotation of the rotor and its offset forwardly from the line A—A, is determined in accordance with the following.

Its distance from the center of rotation (the axis of the hub) should be such that during application of the driving torque to the hub, the centrifugal force on the blade, even when rotating at a substantially higher than normal autorotational speed, is insufficient to overcome or balance the lagging effect incident to application of the driving torque. During application of the driving torque, therefore, the stop surface 43 remains in engagement with stop 40. On cessation of the driving torque, the blade moves about the pivot 15 under the influence of the restoring moment set up by centrifugal force until the stop surface 44 abuts the stop 41 (the position of Figure 2). The offset of pivot 15 with respect to line A—A should be sufficient to ensure positive action with respect to change of blade pitch from the low to the higher value.

In normal autorotative flight operation, therefore, lag and lead movements of the blade in response to flight forces take place about the drag pivot 11, the pitch change pivot remaining ineffective. To ensure that this condition will prevail, the forward offset of the pitch pivot 15 should be sufficient so that even with maximum leading displacements of the blade about the drag pivot 11, a line joining the center of gravity of the blade and the hub axis will lie behind the axis of pivot 15. Unless the foregoing condition exists there would be an undesirable reverse moment about the pitch pivot 15, which condition would be further aggravated by the action of the blade damper device 12.

The two offsets of the pitch pivot 15 (offset from the center of rotation and offset from the blade axis) are, of course, related to each other in the sense that different values for one offset will require different values for the other.

In accordance with the foregoing, the invention provides a pivotal blade mounting affording freedom for pitch change movements for starting and take-off purposes, and also for lag and lead movements under the influence of flight forces, the entire blade operation as to these movements being automatic in that the driving torque and flight forces are utilized to ensure flight movements about the drag pivot and pitch change movements for starting and take-off about the pitch change pivot.

With a view to ensuring positive retention of the desired blade position either in driving the rotor or in flight, a latch mechanism is preferably employed. This latch includes a pin 45 adapted alternatively to engage in apertures 46 and 47 formed in the arcuate member 39. These two apertures define the zero and flight pitch positions, and when the pin is in engagement with either, the blade is positively retained in that position. The latch is urged in a direction to enter either aperture by means of compression spring 48 housed within a suitable bore formed in the outer end of arm 42, which arm has a central cut-out portion 49 receiving lever 50 to which the pin is coupled as at 51. At one end the lever is carried by a pivot 52 supported by apertured ears 53. At its other end the lever is connected to a cable 54 extended inwardly and thence downwardly into the central hollow in the hub for attachment to ring 55 which is vertically movable in the hub but restrained as against rotation relative to the hub by a spline 56. In order to avoid undesired actuation of the latching pins as a result of upward and downward flapping movement of the blades on the pivot 6, a flexible sheath 57 is provided for the cable, this sheath being secured as by brackets 58 to the link 16 and also to the interior of the hub.

Ring 55 may be moved downwardly in order to withdraw the latching pins by means of a cable 59 to which is connected at its upper end to an inner bearing member 60, with respect to which the ring 55 is freely rotatable. Cable 59 may pass over a suitable pulley 61 for connection with arm 62 of a bell crank pivoted at 63, the other arm 64 of this bell crank being positioned to engage a projection or cam element 65 which is carried by the starter clutch actuating shaft 35. As will be seen from the dotted line position of lever 64 and of the operating handle 35a for the clutch, the lever is raised during outward movement of the clutch control and then lowered again when the clutch control reaches its outermost position. Similar movement of lever 64 takes place upon return movement of the clutch control.

To consider the operation of this mechanism, assume first that the craft is on the ground and preparation is being made to effect a take-off. For this purpose, after starting of the propulsion engine which drives shaft 30, the pilot draws the clutch handle 35a outwardly, an initial portion of this movement resulting in raising of the lever 64 with the result that the latching pins 45 for the several blades are withdrawn from the apertures 47. Further movement of the clutch handle commences actual engagement of the clutch, so that rotation of the rotor commences, the lever 64 being so shaped that during this intermediate portion of the outward movement of handle 35a, the latching pins remain disengaged to ensure that the blades lag on the pitch change pivot 15 and thus move to the low pitch position. Upon complete engagement of the starter clutch, the lever 64 is again permitted to drop to its lower position, as a result of which the springs 48 for the latching pins 45 cause these pins to enter apertures 46 and thus ensure retention of zero pitch during driving and overspeeding of the rotor. Engagement of the pins in the aperture 46 in this manner ensures that the desired zero pitch position will be maintained even in the event of partial failure of the driving torque, as a result, for example, of the engine stalling. When the desired rate of rotor rotation has been attained, the clutch handle 35a is pushed inwardly again to the off position, and during this inward movement the lever 64 is raised and maintained in its upper position until the clutch is disengaged, thus removing the torque from the hub and permitting the action of centrifugal force to move the blades about the pitch change pivots 15. Completion of the inward movement of handle 35 again permits the lever 64 to return to its lower position, in which the latching pins will engage in apertures 47, thereby ensuring retention of the desired pitch setting for normal flight operation.

Figure 3:
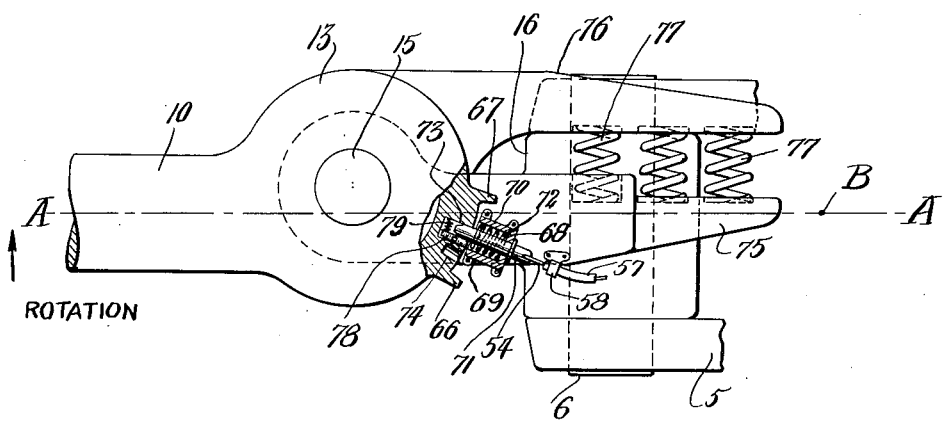
Figure 3 is a view similar to Figure 2 but illustrating a modified construction.

The arrangement shown in Figure 3 differs from the form described above chiefly with respect to the range of pitch change movement permitted about the pivot 15. As here shown, one of the bearing housings 13 for the pivot 15 is provided with radially projecting stops 66 and 67 defining a range of movement limited, on the one hand (by stop 66) to a value approximating zero pitch position for starting purposes as before, and, on the other hand (by stop 67) to a value substantially higher than the normal autorotational pitch. A cooperating stop device 68 is mounted on the link 16 and provided with abutment surfaces 69 and 70 adapted to cooperate respectively with stops 66 and 67. This device 68 further serves to house the latching pin 71 which is urged inwardly (to latching position) by means of the spring 72. Intermediate the travel provided between the stops 66 and 67, the housing 13 has a recess 73 into which the pin 71 projects, to retain the blade in the position of substantially normal autorotational pitch. Another recess for the latching pin is provided toward the low pitch end of the range, as at 74.

Figure 2:
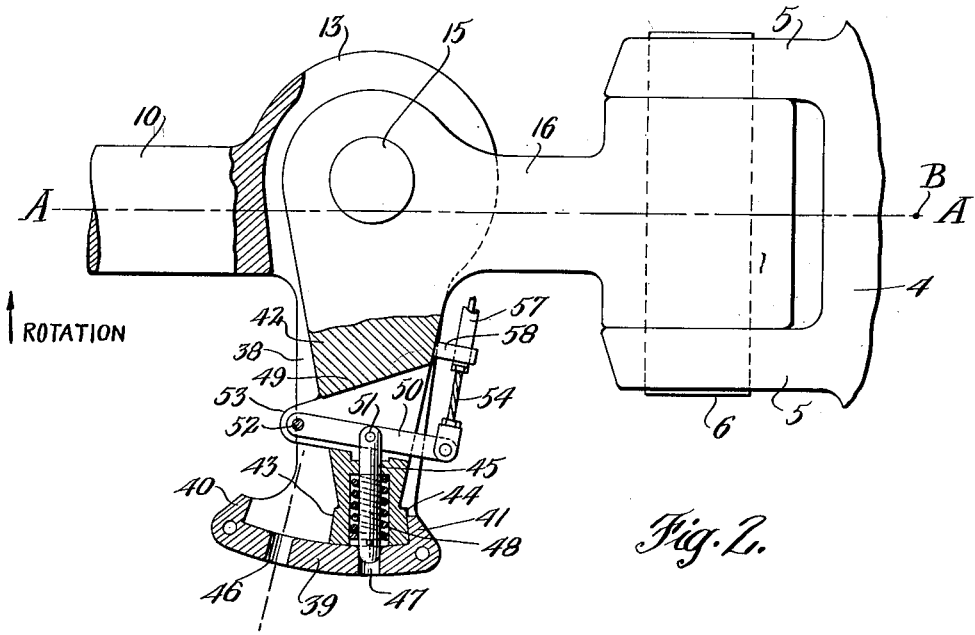
Figure 2 is a view taken as indicated by the line 2—2 on Figure 1, the view being on an enlarged scale and certain parts of the locking means shown in section.

Link 16 further carries an arm 75 projecting inwardly therefrom over the flapping pivot 6 to cooperate with a complementary arm 76 which is rigid with one of the bearing housings 13. These two levers (75 and 76) thus move toward and away from each other during movement of the blade about pivot 15. Compression springs 77 are interposed between these two levers so as to urge them away from each other. The purposes and action of the foregoing mechanism can best be understood from a description of its operation as given just below, it being here pointed out that the control system for the latch as shown and described in connection with Figures 1 and 2, is here also intended to be utilized.

Upon commencement of the movement of the clutch control handle 35a from off toward on position, the cable 54 withdraws latching pin 71 against the pressure of spring 72. As the rotor starts turning in response to engagement of the clutch, the blade lags about pivot 15 until stop surface 69 comes into engagement with stop 66. When the clutch is fully engaged, the resultant drop of lever 64 of the control system permits spring 72 to advance the latch pin 71 into aperture 74. This therefore positively retains the blade pitch at the desired low value for starting and overspeeding.

Upon releasing movement of the clutch control 36a, the latch pin is first withdrawn and then the torque is cut off from the rotor (by disconnection of the clutch 29), in consequence of which the action of centrifugal force on the blade causes it to move forwardly about the pivot 15 until the abutment surface 70 comes into contact with the stop 67. As a safety device to prevent engagement of pin 71 in the recess 73 during this movement, a member 78 is pivotally mounted within recess 73 and urged by compression spring 79 to a position in which the opening to recess 73 is at least in part blocked. Assurance is thereby provided that the latching pin will pass across the aperture 73 to permit the blade pitch to increase to the higher than normal autorotational value defined by the stop 67.

The high pitch, of course, produces a high initial thrust, and when the kinetic energy stored in the rotor has been expended, the rotor slows down to a speed approximating the normal autorotational speed. When this occurs, the springs 77 urge the arms 75 and 76 away from each other, and this results in movement of the blade about pivot 15 rearwardly with respect to the direction of rotation. Motion in this direction, however, is arrested by engagement of the latching pin 71 in recess 73, this engagement being permitted by virtue of the pivotal mounting of the member 78. The position of the parts shown in Figure 3 is that of normal flight operation when the rotor is autorotationally actuated. A latching device of this general type is disclosed in my copending application 147,460, filed June 10, 1937.

In connection with the spring 77 and the lagging moment produced thereby, in the preferred arrangement the relation between this moment and the leading moment which is set up as a result of centrifugal force (because of the forwardly offset position of pivot 15), is such that the two moments substantially balance each other at a rotational speed approximating that of normal autorotational flight for the rotor. As the rotational speed increases, the centrifugal moment also increases, and by virtue of this fact I am enabled to obtain automatic "overpitching" for jump take-off purposes, as well as automatic return of blade pitch from the higher than normal value to the normal autorotational value.

As with the arrangement of Figures 1 and 2, the latching device need not necessarily be employed, although I prefer to use it in order to positively assure maintenance of the desired pitch under all conditions.

In both of the arrangements described, provision is made for pitch change movements about an oblique pivot for starting and take-off purposes, and at the same time the mechanism is so worked out that under the influence of the normal forces of flight (in the absence of torque applied to the rotor) lag and lead displacements of the blade take place about one pivot, which, in the preferred arrangement, is not accompanied by pitch change movements, at least not to the same degree or necessarily in the same sense as the pitch change about the oblique pivot. Stated in another way, the lag and lead movements of flight operation are assigned to one pivot, and the lag and lead movements incident to application and cessation of torque are assigned to another pivot, the operation being automatic since the torque and flight forces alone are sufficient to maintain the desired operation on the two pivots.

Advantages are also to be attained in using the latch control devices, as a result of which, for example, stalling of the engine during driving will not result in change of blade pitch which might effect premature take-off.

I claim:

1. In an aircraft sustaining rotor having a hub and a blade, pivot means articulating the blade to the hub comprising a pivot having its axis angled with respect to a plane perpendicular to the axis of the hub and passing a line joining the center of gravity of the blade and the axis of the hub in a forwardly offset position with respect thereto when the blade is in true radial position.

2. In an aircraft sustaining rotor having a hub and a blade, pivot means articulating the blade to the hub comprising a pivot having its axis angled with respect to a plane perpendicular to the axis of the hub and passing a line joining the center of gravity of the blade and the axis of the hub in a forwardly offset position with respect thereto when the blade is in true radial position, and a stop limiting leading displacement of the blade about said pivot axis.

3. In an aircraft sustaining rotor having a hub and a blade, pivot means articulating the blade to the hub comprising a pivot having its axis angled with respect to a plane perpendicular to the axis of the hub and passing a line joining the center of gravity of the blade and the axis of the hub in a forwardly offset position with respect thereto when the blade is in true radial position and a stop limiting leading displacement of the blade about said pivot axis to a position in which the blade is in a truly radial position.

4. In an aircraft sustaining rotor having a hub and a blade, pivot means for articulating the blade to the hub including two pivots both angled with respect to a plane perpendicular to the hub axis, the axis of one of said pivots passing a line joining the center of gravity of the blade and the hub axis in a forwardly offset position with respect thereto when the blade is in true radial position.

5. In an aircraft sustaining rotor having a hub and a blade, pivot means articulating the blade to the hub comprising a pivot having its axis angled with respect to a plane perpendicular to the axis of the hub and passing a line joining the center of gravity of the blade and the axis of the hub in a forwardly offset position with respect thereto when the blade is in true radial position, and a stop limiting leading displacement of the blade about said pivot axis, the position of the pivot axis and of said stop being such that under flight conditions without torque applied to the rotor hub said stop remains in engagement, but that upon application of a driving torque to the rotor hub, the blade lags about said pivot axis.

6. In an aircraft sustaining rotor having a hub and a blade, pivot means articulating the blade to the hub including a pivot whose axis is inclined upwardly and outwardly with respect to the longitudinal blade axis to provide for decrease of blade pitch upon lagging movements thereof and increase of blade pitch upon leading movements, the axis of said pivot passing a line joining the center of gravity of the blade and the axis of the hub in a forwardly offset position with respect thereto when the blade is in true radial position.

7. In an aircraft sustaining rotor having a hub and a blade, pivot means for articulating the blade to the hub including two pivots both angled with respect to a plane perpendicular to the hub axis, the axis of one of said pivots being inclined upwardly and outwardly with respect to the longitudinal blade axis to provide for decrease of blade pitch upon movements thereof in the lagging direction and increase of blade pitch upon movements from a lagging position, and said one pivot axis passing a line joining the center of gravity of the blade and the axis of the hub in a forwardly offset position with respect thereto when the blade is in true radial position.

8. In an aircraft sustaining rotor having a hub and a blade, pivot means for articulating the blade to the hub including two pivots both angled with respect to a plane perpendicular to the hub axis, the axis of one of said pivots being inclined upwardly and outwardly with respect to the longitudinal blade axis to provide for decrease of blade pitch upon movements thereof in the lagging direction and increase of blade pitch upon movements from a lagging position and said one pivot axis passing a line joining the center of gravity of the blade and the axis of the hub in a forwardly offset position with respect thereto when the blade is in true radial position, the position of said one pivot axis and of the stop being such that under all normal flight conditions said stop remains in engagement but that upon application of a driving torque to the rotor hub, the blade lags about said one pivot axis.

9. In an aircraft sustaining rotor having a hub and a blade, pivot means articulating the blade to the hub comprising a pivot having its axis angled with respect to a plane perpendicular to the axis of the hub and passing a line joining the center of gravity of the blade and the axis of the hub in a forwardly offset position with respect thereto when the blade is in true radial position, and a releasable latch device for retaining the blade in true radial position about said pivot.

10. In an aircraft sustaining rotor having a hub and a blade, a pivot joining the blade with the hub and having its axis obliquely inclined with respect to the longitudinal blade axis to provide for pitch change movements of the blade upon displacements thereof in lagging and leading directions, the axis of said pivot passing a line joining the center of gravity of the blade and the hub axis in horizontally offset relation with respect thereto, means for applying a driving torque to the rotor, and means for holding the blade in low pitch position on said pivot axis during application of the drive.

11. In an aircraft sustaining rotor having a hub and a blade, a pivot joining the blade with the hub and having its axis obliquely inclined with respect to the longitudinal blade axis to provide for pitch change movements of the blade upon displacements thereof in lagging and leading directions, the axis of said pivot passing a line joining the center of gravity of the blade and the hub axis in horizontally offset relation with respect thereto, means for applying a driving torque to the rotor, and mechanism for controlling the pitch position of the blade including means for holding the blade in low pitch position about said pivot axis during application of the drive and means for holding the blade in higher pitch position on said pivot axis in flight operation in the absence of substantial torque applied to the rotor.

12. In an autorotatable aircraft sustaining rotor, a rotor hub, a blade, pivot mechanism connecting the blade with the hub including a pivot providing for lag and lead displacements of the blade during autorotative flight operation, drive means for the rotor, a pivot having its axis obliquely angled with respect to the longitudinal blade axis and providing for pitch change movements of the blade upon application of the driving torque to the rotor, the axis of the second pivot being forwardly offset from the longitudinal blade axis.

13. In a bladed aircraft sustaining rotor capable of autorotative actuation in flight, mechanism for mounting the blade on a rotative hub including a pivot providing freedom for lag and lead displacements under the influence of normal flight forces and a pitch change pivot automatically operative to change the blade pitch under the influence of the application of a driving torque to the rotor, movement of the blade about the pitch change pivot being restrained during autorotational actuation of the rotor by the action of centrifugal force on the blade in the absence of a driving torque, the axis of said pitch change pivot being horizontally offset from a line joining the center of gravity of the blade and the hub axis.

14. In an aircraft having an autorotationally actuable sustaining rotor incorporating a hub and a blade, and mechanism for driving the rotor, pivot means for connecting the blade with the hub including a pivot providing for pitch change movements of the blade within a range limited on the one hand by the substantially zero pitch position of the blade, and on the other hand by a pitch position substantially higher than the normal autorotational value, said pivot means providing for movement of the blade to the substantially zero pitch position automatically upon application of the driving torque to the rotor and for movement of the blade to the pitch position higher than the normal autorotational value upon cessation of driving torque at a rate of rotation higher than the normal autorotational rate, and means urging the blade to move on said pitch change pivot from its higher than normal autorotational pitch position to said autorotational pitch position and providing for such pitch change movement upon reduction in speed of rotation from a higher than normal rate to the normal autorotational rate.

15. In an aircraft having an autorotationally actuable sustaining rotor incorporating a hub and a blade, and mechanism for driving the rotor, pivot means for connecting the blade with the hub including a pivot providing for pitch change movements of the blade within a range limited on the one hand by the substantially zero pitch position of the blade, and on the other hand by pitch position substantially higher than the normal autorotational value, said pivot means providing for movement of the blade to the substantially zero pitch position automatically upon application of the driving torque to the rotor, and for movement of the blade to the pitch position higher than the normal autorotational value upon cessation of driving torque at a rate of rotation higher than the normal autorotational rate, means urging the blade to move on said pitch change pivot from its higher than normal autorotational pitch position to said autorotational pitch position and providing for such pitch change movement upon reduction in speed of rotation from a higher than normal rate to the normal autorotational rate, and a releasable latch device for retaining the blade in the autorotational pitch position.

16. In an aircraft having an autorotationally actuable sustaining rotor incorporating a hub and a blade, and mechanism for driving the rotor, a pivot means for connecting the blade with the hub including a pivot providing for pitch change movements of the blade within a range limited on the one hand by the substantially zero pitch position of the blade, and on the other hand by pitch position substantially higher than the normal autorotational value, said pivot means providing for movement of the blade to the substantially zero pitch position upon application of the driving torque to the rotor, and for movement of the blade to the pitch position higher than the normal autorotational value upon cessation of driving torque at a rate of rotation higher than the normal autorotational rate, means urging the blade to move on said pitch change pivot from its higher than normal autorotational pitch position to said autorotational pitch position and providing for such pitch change movement upon reduction in speed of rotation from a higher than normal rate to the normal autorotational rate, and a releasable latch device for locking the blade in the substantially zero pitch position.

17. For an aircraft, an autorotatable sustaining rotor having a hub and a blade, pivot mechanism mounting the blade on the hub including a pivot whose axis is oblique to the longitudinal axis of the blade whereby to effect blade pitch variation when the rotor is power driven, and means positively rendering said pivot ineffective to vary the blade pitch during normal autorotational flight operation of the rotor.

18. In an aircraft sustaining rotor, a generally upright hub, a generally radially extending blade, and pivot mechanism mounting said blade on said hub comprising a pivot axis providing for generally up and down flapping movements of the blade, a pivot axis radially offset from the hub axis and providing for blade movements generally forwardly and rearwardly in the rotative path, and a pivot axis at an angle to a plane perpendicular to the hub axis and offset from a line perpendicular to the hub axis and intersecting the second named pivot axis.

19. In an aircraft sustaining rotor, a generally upright hub, a generally radially extending blade, and pivot mechanism mounting said blade on said hub comprising a pivot axis providing for generally up and down flapping movements of the blade, a pivot axis radially offset from the hub axis and providing for blade movements generally forwardly and rearwardly in the rotative path, and a pivot axis extending obliquely to a plane perpendicular to the hub axis in a sense providing for pitch variation of the blade and horizontally offset from a line perpendicular to the hub axis and intersecting the second named pivot axis.

HARRIS S. CAMPBELL.